Nov. 12, 1929. A. F. FILES 1,735,077
DISPENSING DEVICE FOR MATERIAL
Filed Feb. 9, 1928
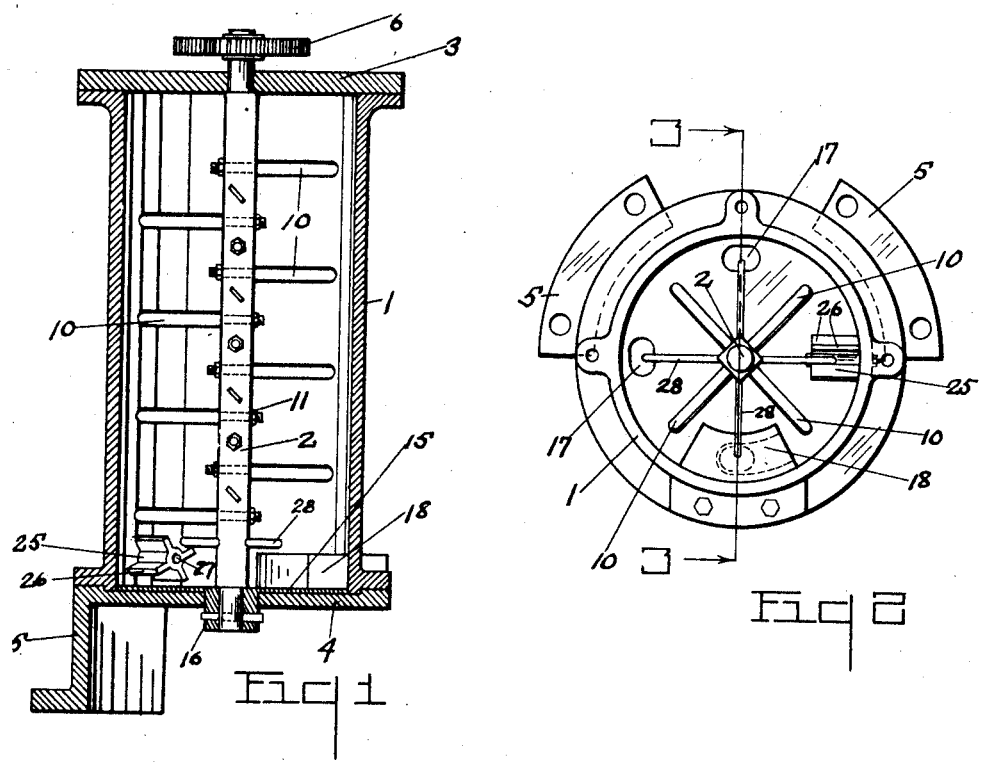
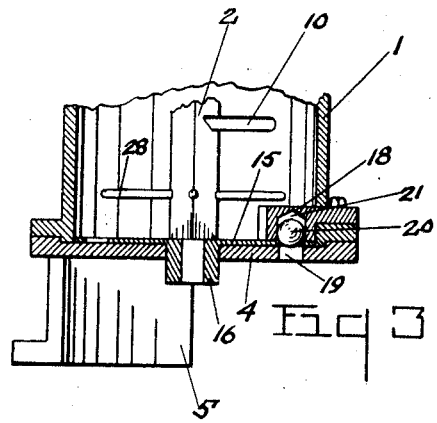
Inventor
Adino F. Files.
By Faust F. Crampton.
Attorney Patented Nov. 12, 1929

1,735,077

UNITED STATES PATENT OFFICE

ADINO F. FILES, OF MAUMEE, OHIO

DISPENSING DEVICE FOR MATERIAL

Application filed February 9, 1928. Serial No. 253,039.

My invention has for its object to provide a device for dispensing finely divided material, such as powdered material, more or less amorphous and compactible in its character. In the dispensing of such material it has been found difficult to dispense uniform quantities of the material owing to its compactibility. Also, as is well known in connection with a great many forms of powdered material, the compactibility is dependent upon atmospheric conditions, particularly as to humidity, with the result that a very slight amount of dampness will cause increased compaction. The invention has for its object to produce a uniform degree of compaction of material located within a confined space.

The invention may be contained in devices used for a great variety of purposes. To illustrate a practical application of the invention, I have selected a dispensing device containing the invention as an example of the practical applications of the invention and shall describe the device selected hereinafter. The dispensing device referred to is shown in the accompanying drawing.

Fig. 1 is a view of a vertical section through the dispensing device. Fig. 2 is a top view of the dispensing device shown in Fig. 1. Fig. 3 is a view of a section taken on the plane of the line 3—3 indicated in Fig. 2.

The dispensing device shown in the drawing comprises a cylinder in which a comminuated material may be inserted and which is to be dispensed by the device. A spindle 2 is located within the cylinder 1 and is rotatably supported in suitable bearings located at the ends of the cylinder 1. The upper end of the cylinder 1 may be provided with a circular or substantially semi-circular plate 3 through which the end of the spindle 2 protrudes. A gear wheel 6 is keyed to the upper protruding portion of the spindle 2, for rotating the spindle 2 by a motor or other suitable means. The lower end of the cylinder 1 is closed by means of a plate 4 that is formed integrally with a pair of brackets 5. The brackets 5 may be secured to a suitable base for supporting the dispensing device.

The spindle 2 is provided with a plurality of agitating blades 10 that are adjustably secured to the spindle 2 by means of suitable nuts 11 that are located on shanks of the blades 10 which extend through the spindle 2. Thus the planes of the blades 10 may be varied in their angular relation to the shaft 2 so as to vary the downward movement of the material or to hold the material as against compaction at the bottom of the cylinder 1 by reason of the weight of the material in the cylinder 1.

The lower end of the cylinder 1 is provided with means for dispensing material at a rate that corresponds to the rate of rotation of the spindle 2. The disc 15 covers the lower end of the interior of the cylinder 1 and is connected to the spindle 2. The disc 15 is provided with a hub 16 that fits on the lower end of the spindle 2. The hub 16 projects into and bears with the plate 4. The disc 15 is provided with a plurality of openings 17 that may be of any desired shape. The material to be dispensed is gathered in the openings 17 as the disc 15 is rotated and its quantity is roughly controlled by the angle at which the lower blades 10 are located with respect to the spindle 2. The disc 15 moves under a block 18. The plate 4 is provided with an opening 19 which is located below the block 18 and the block 18 is provided with a means for pressing the material that collects in the openings 17 formed in the disc 15 as the openings 17 pass over and register with the opening 19. The material is pressed out of the openings 17 as they move sequentially over the opening 19 in the rotation of the spindle 2 and the disc 15. The material drops through the opening 19 in the form of lozenges that conform to the shape of the opening 19 and having a thickness substantially the same as that of the plate 15 provided the material is sufficiently compacted within the openings 17. Otherwise, the material when it drops through the opening 19 subdivides and breaks up into smaller portions.

In order to uniformly compact the material that is fed into the openings 17 from the cylinder 1, notwithstanding the fact that the cylinder 1 may be filled with the material and the disc 15, with its openings 17, is located at the bottom of the cylinder 1, I have provided a means whereby the material will be compacted within the confines of the openings 17 to a substantially uniform degree. The material is maintained in a loose condition by means of the blades 10, and, as the disc 15 rotates, the openings 17 are filled. At one side of the cylinder I have provided a paddle wheel 25 having paddles 26 that are rotatably supported on a shaft 27 that may be secured in the wall of the cylinder 1. The paddle wheel 25 is so located that its paddles 26 may wipe the surface of the disc 15 in the regions of the openings 17. The spindle 2 is provided with pins 28 that protrude from the shaft so as to engage the paddles 26 and cause rotation of the paddle wheel 25 as each of the openings 17 passes beneath the paddle wheel 25. By this wiping movement of the paddle wheel 25, the material is compacted into the openings 17 by the movement of the lowermost paddle 26 and by the movement of the disc 15. If desired, the paddles 26 of the paddle wheel 25 may be formed of a flexible material, such as rubber, so that the wiping action of the paddles 26 will have a more compacting effect upon the material located within the openings 17 of the disc 15. Thus, there is produced a wiping movement in a direction opposite to that in which the disc 15 is moved by the rotation of the spindle 2 which causes the compacting operation to quickly pass over the entire length of the opening 17 and thus produce a downward and lateral movement of the material into each of the openings 17. The portion of the disc 15 having the material thus compacted by the paddle wheel 25 is conveyed to a point beneath the block 18 where the material is discharged through the opening 19 by the contact of an ejecting means located in the block 18. In the form of construction shown in the figures, a weighted ball 20 is located within the block 18 which readily rolls over the disc 15 as it rotates and thus continuously agitates the material that may be located within the recess 21 formed in the block. The weight of the ball 20 is sufficient to discharge the compacted material from the openings 17 as they pass over the opening 19.

I claim:

1. In a dispensing device, a container having an opening, a block located above the said opening, a disc movable beneath the said block and having openings adapted to register with the opening in the container, a spindle connected to the said disc for rotating the disc and having blades for controlling the movement of the material dispensed towards the said opening, a paddle wheel having paddles adapted to make contact with the disc, the said spindle having fingers for engaging the paddle wheel to cause the rotation of the paddle wheel and movement of the paddles of the paddle wheel against the disc and in a direction opposite to that in which the disc moves.

2. In a dispensing device for dispensing material, a container having an opening, a movable member located in the container having an opening adapted to register with the said opening of the container to permit the material to escape from the opening in the movable member, means for operating the movable member, a paddle, means for moving the paddle in the direction opposite to that in which the movable member is moved to produce registration of the openings, the paddle operating to wipe the material into the opening in the movable member.

3. In a dispensing device for dispensing material, a container having an opening, a movable member located in the container having an opening adapted to register with the said opening of the container to permit the material to escape from the opening in the movable member, means for operating the movable member, a paddle, means for moving the paddle in the direction opposite to that in which the movable member is moved to produce registration of the openings, the paddle operating to wipe the material into the opening in the movable member, and a fixed member covering the said opening in the container to prevent material escaping through the said openings in the container and the movable member.

In witness whereof I have hereunto signed my name to this specification.

ADINO F. FILES.